US006896164B2

(12) United States Patent
Fialla-Dori

(10) Patent No.: US 6,896,164 B2
(45) Date of Patent: May 24, 2005

(54) PURSE CADDY

(76) Inventor: Eva H. Fialla-Dori, 204 Three Islands Blvd., No. 302, Hallandale, FL (US) 33009-7301

(*) Notice: Subject to any disclaimer, the term of this patent is extended or adjusted under 35 U.S.C. 154(b) by 143 days.

(21) Appl. No.: 10/364,321

(22) Filed: Feb. 12, 2003

(65) Prior Publication Data
US 2004/0155080 A1 Aug. 12, 2004

(51) Int. Cl.⁷ .................................................. B60R 7/00
(52) U.S. Cl. ........................ 224/275; 224/585; 224/602; 383/6; 294/146
(58) Field of Search ................................ 224/153, 600, 224/602, 275, 585; 383/6, 18, 117; 294/146, 152

(56) References Cited

U.S. PATENT DOCUMENTS

| 326,750 | A | | 9/1885 | King |
| 486,875 | A | | 11/1892 | Jeschke |
| 682,493 | A | | 9/1901 | Pendleton |
| 745,251 | A | | 11/1903 | Sleght |
| 954,840 | A | * | 4/1910 | Wiedemann ................. 294/141 |
| 2,167,363 | A | | 7/1939 | Hoenigsberger |
| 2,784,890 | A | * | 3/1957 | Chisholm .................... 294/152 |
| 5,354,119 | A | | 10/1994 | Nicholas |
| 5,409,282 | A | * | 4/1995 | Bale ........................... 294/152 |
| 5,489,021 | A | * | 2/1996 | Wallingford ................. 206/214 |
| 5,695,233 | A | | 12/1997 | Feldman |
| 6,095,213 | A | * | 8/2000 | Roegner ...................... 150/106 |

* cited by examiner

Primary Examiner—Stephen K. Cronin
(74) Attorney, Agent, or Firm—Stephen R. Greiner

(57) ABSTRACT

A purse caddy for supporting a purse in an upright condition upon a vehicle seat. The purse caddy includes an open-topped box dimensioned to receive a purse and a strap for supporting the open-topped box. The open-topped box has: a bottom panel, a front panel hingedly secured to the bottom panel and extending upwardly from the bottom panel, a back panel hingedly secured to the bottom panel at a location remote from the front panel and extending upwardly from the bottom panel, and at least one elastic strip connecting the front panel and the back panel together at a height above the bottom panel. The opposed ends of the strap are connected to the back panel so as to form a loop for encircling a support like the headrest of a vehicle seat.

14 Claims, 1 Drawing Sheet

U.S. Patent May 24, 2005 US 6,896,164 B2
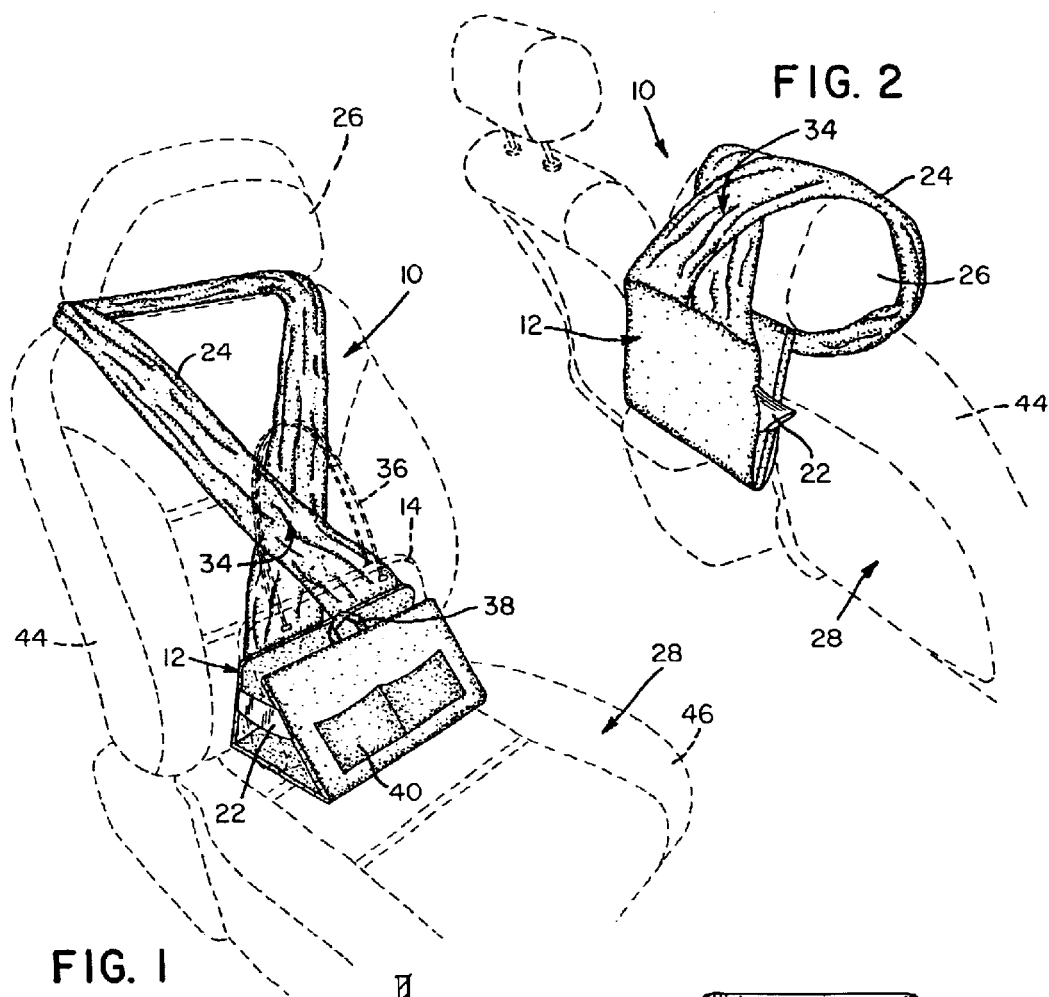
FIG. 1
FIG. 2
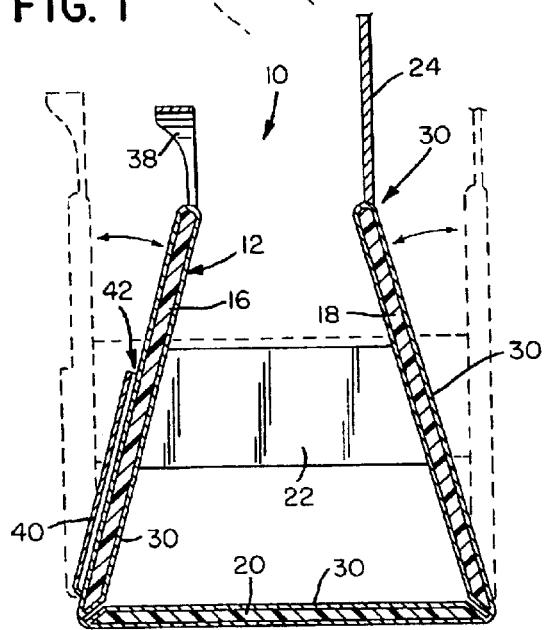
FIG. 4
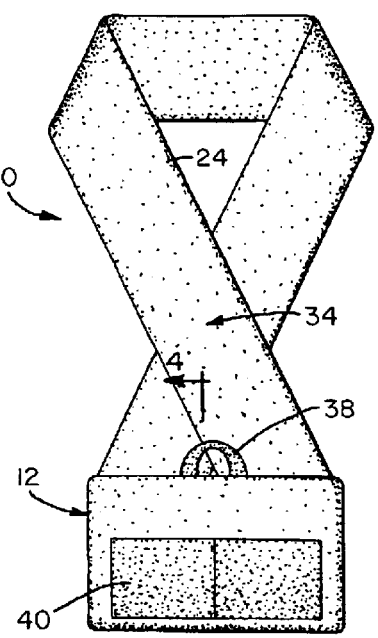
FIG. 3

PURSE CADDY

FIELD OF THE INVENTION

The present invention relates generally to an article carrier having resiliently biased means for selectively fastening the carrier to or around an article.

BACKGROUND OF THE INVENTION

It is not unusual for people who carry purses to place them upon the passenger seat of an automobile for access while driving alone. As is well known, however, sudden stops have a tendency to throw things like purses off of automobile seats and spill their contents onto the floor causing a potentially hazardous condition. Unfortunately, positioning the purse on the floor of an automobile does not prevent spilling and frequently places the purse out of reach of the driver. On the other hand, placing the purse against the hip of the driver or upon her lap interferes with the use of a typical seatbelt and can be uncomfortable. A need therefore, exists for a product that will retain a purse in an upright condition in a vehicle for safe and easy access to a driver of the vehicle.

SUMMARY OF THE INVENTION

In light of the problems associated with the usual manner in which purses are transported in vehicles, it is a principal object of the invention to provide a purse caddy that holds a purse in an upright orientation upon the passenger seat of a vehicle and prevents movement of the purse in the event of a sudden movement of the vehicle. Thus, the spilling of the contents of a purse in a vehicle equipped with the purse caddy due to a sudden stop would be a thing of the past.

It is another object of the invention to provide a purse caddy of the type described that permits one-handed access to a purse and its contents so as to allow the driver of a vehicle to always keep one hand on the steering wheel while the vehicle is in motion. Use of the purse caddy, therefore, does not impair the ability of a driver to control her vehicle.

Still another object of the invention is to provide a purse caddy of the type described that will hold and support purses of a variety of sizes and shapes. The exterior of the purse caddy is soft thereby protecting from scuffs and scratches the purses positioned within it and the vehicles within which it is positioned.

It is a further object of the invention to provide a purse caddy of the type described that can be installed in a vehicle without tools of any sort or special mounting hardware. It is believed that the purse caddy is intuitive to use, requiring no special training.

It is an object of the invention to provide improved elements and arrangements thereof in a purse caddy for the purposes described which is lightweight in construction, inexpensive to manufacture, and dependable in use.

Briefly, the purse caddy in accordance with this invention achieves the intended objects by featuring an open-topped box dimensioned to receive a purse. The open-topped box has front and back panels hingedly secured to a bottom panel. The opposed ends of the front and back panels are secured together by elastic strips that serve as end walls for the open-topped box. An elongated strap connects the opposed ends of the back panels together and may be looped around the headrest of a vehicle seat to secure the open-topped box in an upright position on the vehicle seat.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a purse caddy in accordance with the present invention being deployed upon a vehicle seat in supporting a purse.

FIG. 2 is a perspective view of the purse caddy of FIG. 1 draped over a vehicle seat headrest in a collapsed condition for convenient storage.

FIG. 3 is a front elevational view of the purse caddy.

FIG. 4 is a cross sectional view of the purse caddy taken along line 4—4 of FIG. 3.

Similar reference characters denote corresponding features consistently throughout the accompanying drawings.

DETAILED DESCRIPTION OF THE PREFERRED EMBODIMENT

Referring now to the FIGS., a purse caddy in accordance with the present invention is shown at 10. Purse caddy 10 includes an open-topped box 10 dimensioned to accommodate a typical purse 14 within itself. Open-topped box 12 has a front panel 16 and a back panel 18 hingedly secured to a bottom panel 20. The opposed ends of panels 16 and 18 are secured together by elastic strips 20 that serve as end walls for open-topped box 12. A strap 24 connects the opposed ends of back panel 18 together and may be looped around the headrest 26 of a vehicle seat 28 to secure open-topped box 12 in an upright position on vehicle seat 28.

The hinged connection between front panel 16, bottom panel 20, and back panel 18 is provided by encasing panels 16, 20, and 18 in a fabric sheath 30. The fabric forming sheath 30, being flexible by its nature, permits the angular relationships of panels 16–20 to be selectively varied by a user. Of course, the fabric also protects vehicle seat 28 and purse 14 from wear that might be caused by the use of more rigid hinge elements. Nonetheless, panels 16–20 could be connected together by any suitable means including, by way of example, piano hinges.

Strap 24 comprises an elongated piece of fabric such as that used to form sheath 30. The width of strap 24 is about one half of the length of back panel 18 so that when the two ends of strap 24 are sewn to sheath 30 in a side by side fashion as at 32, a protective pad 34 is formed that extends upwardly from back panel 18. Pad 34 protects vehicle seat 28 from scuffs from purse straps 36 and items being placed within, or removed from, purse 14. To provide pad 34 with a double thickness of fabric, i.e., extra cushioning, the ends of strap 24 are crisscrossed and sewn together adjacent their connection to sheath 30.

Box 12 is easily opened by means of a small loop 38 secured to the top of front panel 16. Preferably, loop 38 is a short length of fabric whose opposed ends are sewn to the portion of sheath 30 encasing front panel 16. If desired, a knob, a button, a tassel, or a like thing could be substituted for loop 38 to permit the ready opening of box 12.

By sewing a rectangular piece of fabric 40 along its bottom, sides and centerline to the portion of sheath 30 covering the front of front panel 16, purse caddy 10 is provided with a pair of easily accessible pockets 42. Within pockets 42 can be stored small items such as writing implements, keys, or a cellular telephone.

Use of purse caddy 10 is straightforward. First, strap 24 is extended around headrest 26 and panels 18 and 20 are positioned respectively against the back part 44 and bottom part 46 of vehicle seat 28. Then, against the light backpressure offered by elastic strips 22, loop 38 is pulled to move front panel 16 away from back panel 18 to the position shown by broken lines in FIG. 4. Next, purse 14 is positioned atop bottom panel 20. Finally, by releasing loop 38, elastic strips 22 pull the open-topped box 12 closed on the bottom and sides of purse 14 in the manner of clamp. This clamping action keeps purse 14 upright and prevents it from becoming disengaged from open-topped box 12 during normal use; however, the clamping action is not so great that entry into purse 14 is impeded. The elastic nature of strips 22 also allows purse caddy 10 to accommodate purses that are both somewhat wider and longer than bottom panel 20.

With purse 14 secured in an upright condition within purse caddy 10, the driver of a vehicle who may be positioned adjacent seat 28 can easily access purse 14 and its contents with a free hand. The purse 14 cannot slide about or tip over, spilling its contents. The purse 14, and any small items placed in pockets 42, are always within reach.

If it is desired that a person rather than purse 14 occupy vehicle seat 28, purse caddy 10 need not be fully disengaged from seat 28. As shown in FIG. 2, open-topped box 12 can be collapsed, by placing panels 16, 18, and 20 against one another, and flipped over headrest 26. Strap 24 securely retains the collapsed box 12 against the back of headrest 26 and, simultaneously, serves as a headrest cover. Should purse caddy 10 not be needed for an extended period, however, purse caddy 10 can be easily collapsed, disengaged from seat 28 and stored in a collapsed condition under seat 28.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A purse caddy, comprising:
    an open-topped box dimensioned to receive a purse, said open-topped box having:
        a bottom panel;
        a front panel hingedly secured to said bottom panel and extending upwardly therefrom;
        a back panel hingedly secured to said bottom panel at a location remote from said front panel and extending upwardly from said bottom panel; and,
        at least one elastic strip connecting said front panel and said back panel together at a height above said bottom panel; and,
    a strap having opposed ends connected to said back panel so as to form a loop for encircling a support, and said strap includes an elongated piece of flexible material having a width that measures about one-half of the length of said back panel and wherein said opposed ends of said strap are secured side-by-side to said back panel.

2. The purse caddy according to claim 1 further comprising a fabric sheath encasing and hingedly securing together, said bottom panel, said front panel and said back panel.

3. The purse caddy according to claim 2 further comprising at least one pocket provided on said fabric sheath for retaining goods on the exterior of said open-topped box.

4. The purse caddy according to claim 1 further comprising a loop secured to the top of said front panel for pulling said front panel away from said back panel against the tension offered by said elastic strip.

5. The purse caddy according to claim 1 wherein said opposed ends of said strap are crisscrossed and secured together adjacent their connection to said open-topped box.

6. A purse caddy, comprising:
    an open-topped box dimensioned to receive a purse, said open-topped box having:
        bottom panel being the bottom wall of said open-topped box;
        a front panel hingedly secured at the bottom thereof to the front of said bottom panel, said front panel being the front wall of said open-topped box;
        a back panel hingedly secured at the bottom thereof to the back of said bottom panel, said back panel being the back wall of said open-topped box; and,
        a pair of spaced apart, elastic strips connecting said front panel and said back panel together above said bottom panel, said elastic strips being the side walls of said open-topped box; and,
    a strap having opposed ends connected to said back panel so as to form a loop for encircling a support, and said strap includes an elongated piece of flexible material having a width that measures about one-half of the length of said back panel and wherein said opposed ends of said strap arc secured side-by-side to said back panel.

7. The purse caddy according to claim 6 further comprising a fabric sheath encasing and hingedly securing together, said bottom panel, said front panel and said back panel.

8. The purse caddy according to claim 7 further comprising at least one pocket provided on said fabric sheath for retaining goods on the exterior of said open-topped box.

9. The purse caddy according to claim 6 further comprising a loop secured to the top of said front panel for pulling said front panel away from said back panel against the tension offered by said elastic strips.

10. The purse caddy according to claim 6 wherein said opposed ends of said strap are crisscrossed and secured together adjacent their connection to said open-topped box.

11. A purse caddy, comprising:
    an open-topped box dimensioned to receive a purse, said open-topped box having:
        a bottom panel being the bottom wall of said open-topped box;
        a front panel hingedly secured at the bottom thereof to the front of said bottom panel, said front panel being the front wall of said open-topped box;
        a back panel hingedly secured at the bottom thereof to the back of said bottom panel, said back panel being the back wall of said open-topped box;
        a fabric sheath encasing and hingedly securing together, said bottom panel, said front panel and said back panel; and,
        a pair of spaced apart, elastic strips connecting said front panel and said back panel together above said bottom panel, said elastic strips being the side walls of said open-topped box; and,
    a strap having opposed ends connected to said back panel so as to form a first loop for encircling a vehicle headrest, and said stray includes an elongated piece of fabric having a width that measures about one-half of the length of said back panel and said opposed ends of said strap are secured side-by-side to said back panel.

12. The purse caddy according to claim 11 further comprising a loop secured to the top of said front panel for pulling said front panel away from said back panel against the tension offered by said elastic strips.

13. The purse caddy according to claim 11 further comprising at least one pocket provided on said fabric sheath for retaining goods on the exterior of said open-topped box.

14. The purse caddy according to claim 11 wherein said opposed ends of said strap are crisscrossed and secured together adjacent their connection to said open-topped box.

* * * * *